(Model.)

F. A. HOWARD.
HANDLE FOR CARBOYS AND OTHER VESSELS.

No. 283,785. Patented Aug. 28, 1883.

WITNESSES:
C. Neveux
C. Sedgwick

INVENTOR:
F. A. Howard
BY
ATTORNEYS.

UNITED STATES PATENT OFFICE.

FRED. A. HOWARD, OF SOUTH EASTON, MASSACHUSETTS.

HANDLE FOR CARBOYS AND OTHER VESSELS.

SPECIFICATION forming part of Letters Patent No. 283,785, dated August 28, 1883.

Application filed November 6, 1882. (Model.)

*To all whom it may concern:*

Be it known that I, FRED. A. HOWARD, of South Easton, in the county of Bristol and State of Massachusetts, have invented a new and useful Improvement in Handles for Carboys and other Vessels, of which the following is a full, clear, and exact description.

This invention, while applicable to various kinds of cans, ash-barrels, and other vessels requiring to be tipped or tilted to empty them of their contents, is more especially designed to be applied as a handle for carboys; and it consists in certain novel constructions of the handle and its socket-plate, whereby cheapness of construction is combined with durability and the handle is prevented from slipping out of its socket, and increased facility afforded for turning and emptying the carboy or other vessel, free from slip or scattering of its contents, and said handle is out of the way when not in use, substantially as hereinafter described.

Reference is to be had to the accompanying drawings, forming part of this specification, in which similar letters of reference indicate corresponding parts in all the figures.

Figure 1:
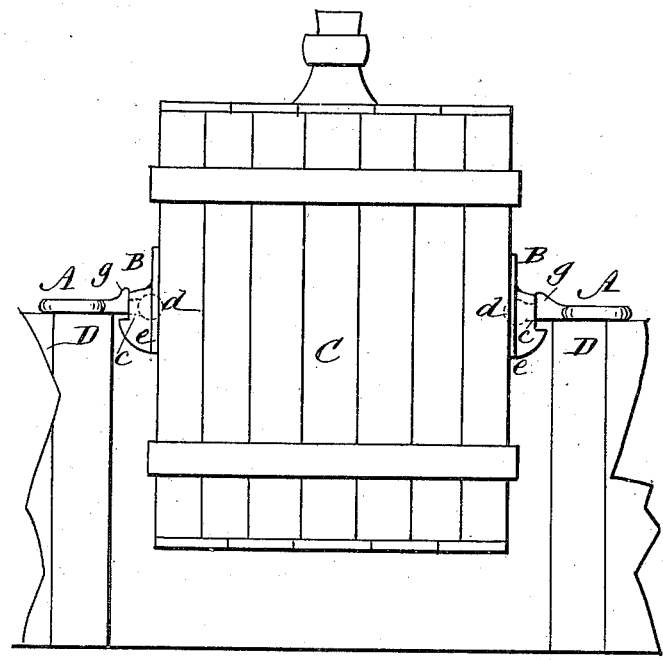
Figure 3:
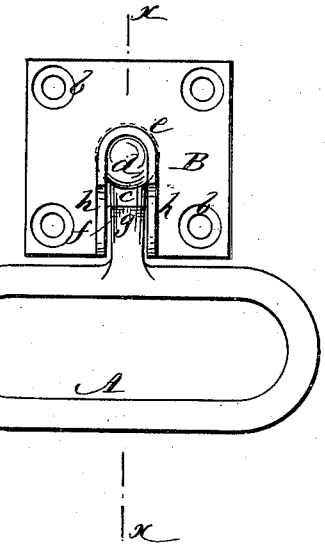
Figure 2:
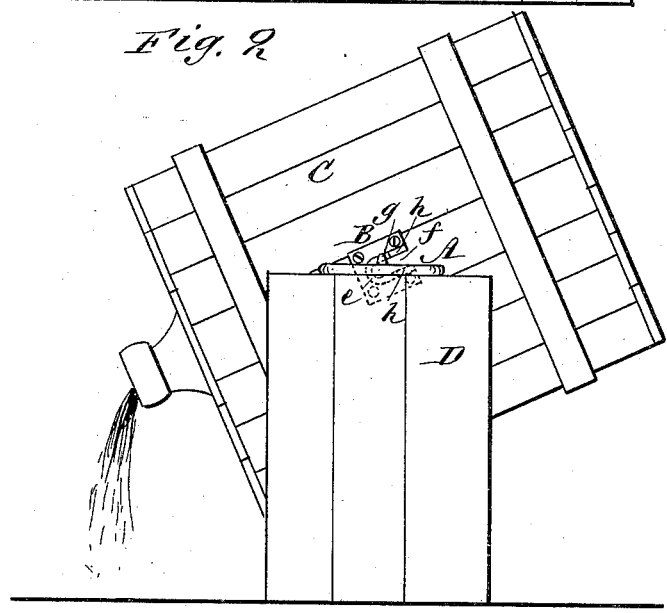

Figure 1 represents a side view of a carboy having a pair of my improved handles applied and as supported by said handles, ready to be turned or tilted on them for the purpose of pouring off its contents. Fig. 2 is a further side view, in a plane at right angles to Fig. 1, of the carboy as being turned on the handles and discharging its contents. Fig. 3 is a face view, upon a larger scale, of one of the handles with its socket-piece detached from the carboy, and showing the handle in a dropped position; and Fig. 4 a section on the line $x\,x$ in Fig. 3, said view also showing by dotted lines the handle when raised or extended and the whole as applied to the side of a carboy or other vessel.

A in the drawings indicates the handle, and B its socket piece or plate. The carboy C is fitted on two of its opposite sides, each with one of these socket-plates B, secured thereto by screws passing through holes $b$ in the plates, and provided each with a handle, A, which is fitted to its socket-plate before securing said plate to the carboy.

The handles A may be of open construction, and are here represented of an oblong loop form to furnish a convenient gripping-surface for the hand. Each of said handles is made with an exterior pivot, $c$, on its inner side, in transverse relation with its loop, and has a ball termination, $d$, which fits within an upper cup-shaped socket, $e$, arranged to project from the front side of the plate B, thus establishing a ball-and-socket joint for the handle. Said cup-shaped socket $e$ also forms a pivot or trunnion-bearing for the pivot $c$ of the handle, and has a slot or opening, $f$, extending down to and through the bottom edge of the plate, whereby provision is made for entering the pivot or trunnion portion of the handle up within the plate B and its ball $d$ within the cup-shaped socket $e$.

Arranged on the upper side of the pivot $c$ of the handle is a projection, $g$, outside of the socket $e$, and opposite side shoulders or projections, $h\,h$, are made below the pivot $c$ when in its place, in or on the exterior of the sides or cheeks of the slotted portion $f$ of the plate B.

Figure 4:
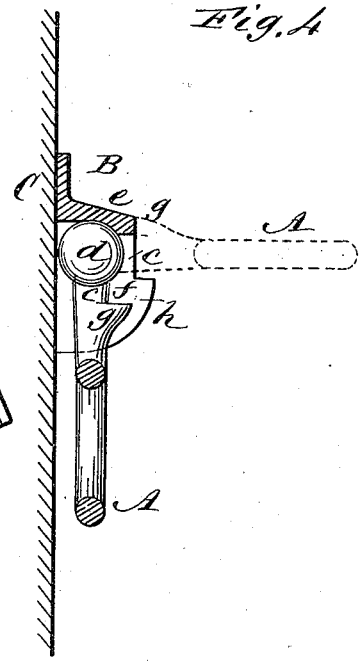

The ball-and-socket and pivot-like construction of the handles A, with their socket-plates B, not merely provides for the swiveling or turning of the handles on or around their axial centers, but also for the dropping of the handle, as shown by full lines in Fig. 4, against the side of the carboy or other vessel; or, in other words, for the universal adjustment of the handle without risk of its detachment from its socket-plate. By means of said handles, with their attached socket-plates, a carboy can be drawn along and handled readily by one man, where two are usually employed, and when the carboy is required to be emptied it is only necessary to raise it by its handles from the floor, and to rest it by the lower sides of the loops of the handles on boxes, chairs, or other supports, D D, as shown in Figs. 1 and 2. The carboy having its outlet uppermost may then be turned on the pivot $c$ and balls $d$ of the handles till the stops or projections $g$, which project upward, come in contact with either of the projections $h\,h$ on each socket-plate by the turning of said plate in common with the carboy. This provides for the easy manipulation and emptying of the carboy without risk of slipping or scattering of its contents, which, when of an acid or corrosive nature, it is very important to avoid. When the carboy or other vessel is not required to be used, the handles are adjusted into position, so as to bring the stops $g$ uppermost and allowed to drop against the sides of the vessel, when they will be out of the way, so far as presenting any objectionable projection is concerned. The stops $g$ and $h\,h$ assist in keeping the handles from dropping out of their places, and limit or adjust the motion of the vessel turning upon them, and the stop $g$, by bearing against the outer face of the cup-socket $e$, keeps the vessel in position when being carried.

But little fitting is necessary after the handles and their socket-plates come from the foundry, and the whole construction is both cheap, durable, and not liable to get out of order.

I do not restrict myself to any particular construction or shape of the supporting-handle A, and it need not be of loop form, but may, if desired, be a solid cross-handle.

I am aware that a handle has been connected with a drawer by a ball-and-socket joint, and a slot in the socket-plate, so as to drop and hang perpendicularly; also, that a handle has been connected with a coffin by a hook and pivot, and that a slot has been made under the pivot in the socket-plate, so as to allow the handle to hang; also with a top shoulder on handle to lock with a corresponding shoulder on the socket-plate, so that the coffin may be lifted; but

What I claim as new and of my invention is—

1. In a rocking or vibratory connection, the opposite side shoulders, $h\,h$, on socket-plate B, in combination with the top shoulder, $g$, on the handle A, whereby the arc in which the carboy may turn is limited, as described.

2. The socket-plate B, made with a slot, $f$, to receive the handle up within it, and provided with a projecting cup-socket, $e$, and stops or projections $h\,h$ on opposite sides of the slot in the plate, substantially as and for the purposes specified.

3. The combination of the supporting-handle A, having a pivot, $c$, ball $d$, and projection $g$, with the slotted socket-plate B, constructed with a projecting cup-socket, $e$, and stops $h\,h$, essentially as shown and described.

FRED. A. HOWARD.

Witnesses:
LORING W. PUFFER,
WILLIAM L. PUFFER.